United States Patent [19]

Reber

[11] 4,015,412

[45] Apr. 5, 1977

[54] HAY-MAKING MACHINE

[76] Inventor: Walter Reber, 50, avenue du Marechal Foch, Saverne (Bas-Rhin), France

[22] Filed: June 16, 1975

[21] Appl. No.: 587,238

[30] Foreign Application Priority Data

July 18, 1974 France ............................ 74.25974

[52] U.S. Cl. ............................................. 56/370
[51] Int. Cl.² ........................................ A01D 79/02
[58] Field of Search ............................ 56/365–370

[56] References Cited

UNITED STATES PATENTS

| 3,555,800 | 1/1971 | Stoll et al. ............................ 56/370 |
| 3,645,077 | 2/1972 | Hauser-Lienhard ................. 56/366 |

FOREIGN PATENTS OR APPLICATIONS 2,019,905   4/1970   Germany ............................ 56/370

*Primary Examiner*—Russell R. Kinsey
*Attorney, Agent, or Firm*—Young & Thompson

[57] ABSTRACT

A hay-making machine for windrowing characterized in that the trajectories described by the outer working tools of the rake wheels overlap between the axes of rotation of the said rake wheels, the outer working tools of one rake wheel passing above the outer working tools of the other rake wheel in the zone of overlap of the said trajectories, and in that - seen perpendicularly of the axis of rotation - the longitudinal axis of the tool-carrier arms crosses the axes of rotation of the rake wheels at two points which are situated at substantially equal distances above the ground.

9 Claims, 4 Drawing Figures

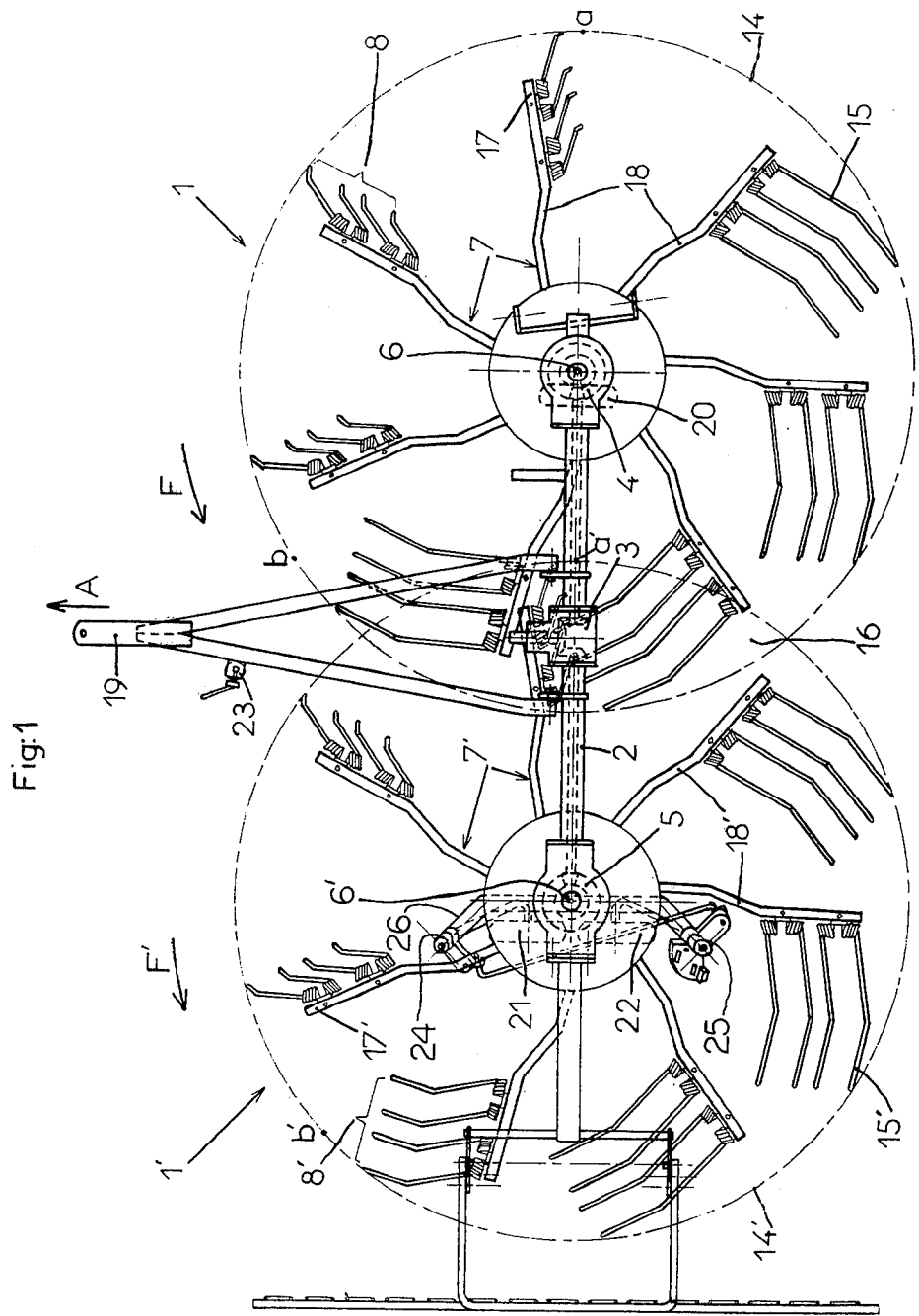

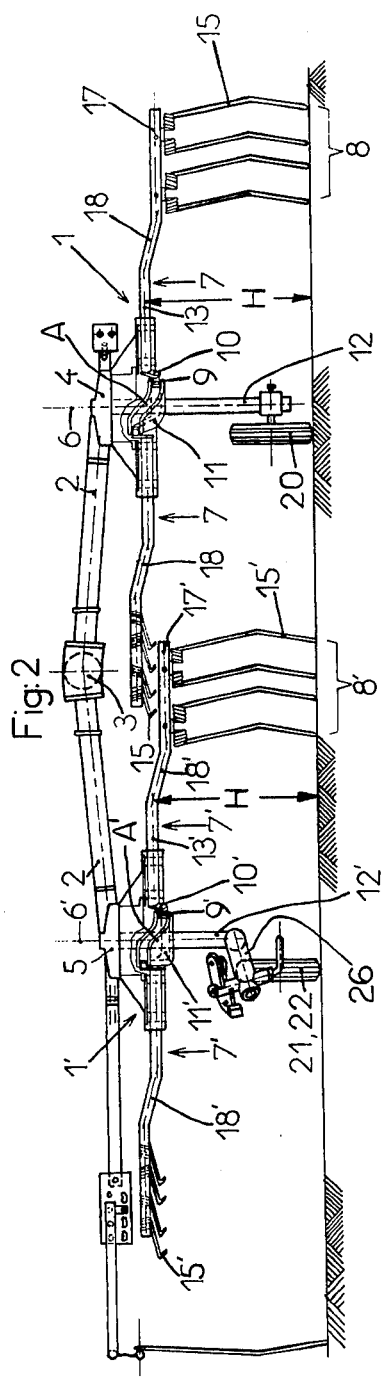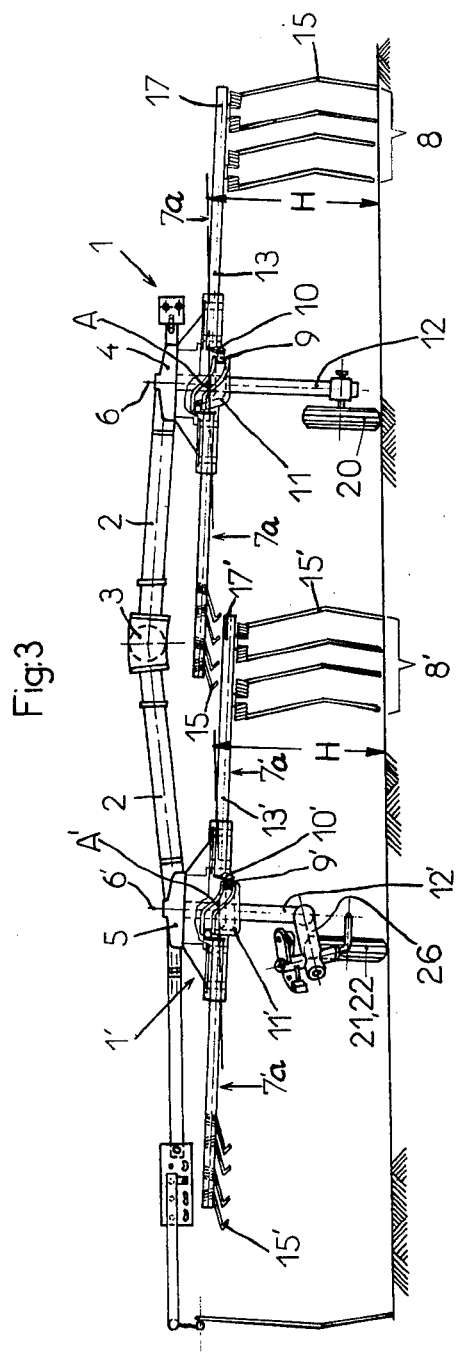

HAY-MAKING MACHINE

INTRODUCTION AND BACKGROUND OF THE INVENTION

The present invention relates to hay-making machines for windrowing, comprising at least two rake wheels driven by the energy of a motor vehicle so as to rotate in identical directions about axes directed upwards and situated at an invariable distance from one another, the said rake wheels comprising arms carrying identical working tools, which arms extend substantially outwards and are guided in such manner that their working tools over a partial range of their revolution, pivot upwards and in the direction opposite to the direction of rotation of the said rake wheels. The guiding of the tool carrier arms can be effected for example by a cam fixed on a spindle concentric with the axis of rotation of the rake wheel.

In practice machines having one rake wheel equipped with such a guide principle have proved excellent for windrowing. As the invention relates to a machine comprising at least two rake wheels, obviously the aim is to obtain a machine having a greater working width.

The selection of a machine on which at least two rake wheels are driven in identical directions of rotation has the purpose of obtaining a machine which permits of easy and rapid production of double windrows, that is in two passages of the machine, which is of particular interest especially for cropping aftermaths.

Now in view of the identical directions of rotation of the two rake wheels, known machines of this kind hitherto required a distance between the rotation axes of two rake wheels at least as great as the external diameter of a rake wheel. This characteristic involves losses of fodder between the said rake wheels. This defect can be diminished but not entirely eliminated by significantly staggering one rake wheel in relation to the other, seen in the direction of travel of the machine. This feature involves fresh complications as regards especially the chassis and the carrier wheels.

In another known machine the planes passing through the longitudinal axes of the tool carrier arms of each rake wheel are situated at different distances above the ground. This embodiment involves the use of working tools of different lengths for each rake wheel, which is irksome both for the manufacturer and for the user.

Thus hitherto no machine of this kind has been capable of being produced in large numbers.

It is the purpose of the present invention to provide a windrowing machine as described in the introduction which does not have the above-mentioned drawbacks.

BRIEF SUMMARY OF THE INVENTION

According to the invention, this windrowing machine is characterised in that the trajectories described by the outer working tools of the rake wheels overlap between the axes of rotation of the said rake wheels, the outer working tools of one rake wheel passing above the outer working tools of the other rake wheel in the zone of overlap of the said trajectories, and in that - seen perpendicuarly of the axes of rotation - the longitudinal axes of the tool-carrier arms cross the axes of rotation of the rake wheels at two points which are situated at substantially equal distances above the ground.

Further characteristics of the invention will appear from the following description with reference to the accompanying drawings which represent several forms of embodiment of the invention by way of non-limitative examples.

BRIEF DESCRIPTION OF THE VIEWS IN THE DRAWINGS

In the drawings:

FIG. 1 represents a plan view of a machine according to the invention is the working position, FIG. 2 represents a partial rear elevational view of a machine according to the invention, FIG. 3 represents a partial rear elevational view of a variant of the machine according to the invention, FIG. 4 represents a plan view of a machine according to the invention in the transport position.

DETAILED DESCRIPTION OF THE PREFERRED EMBODIMENTS

Figure 4:
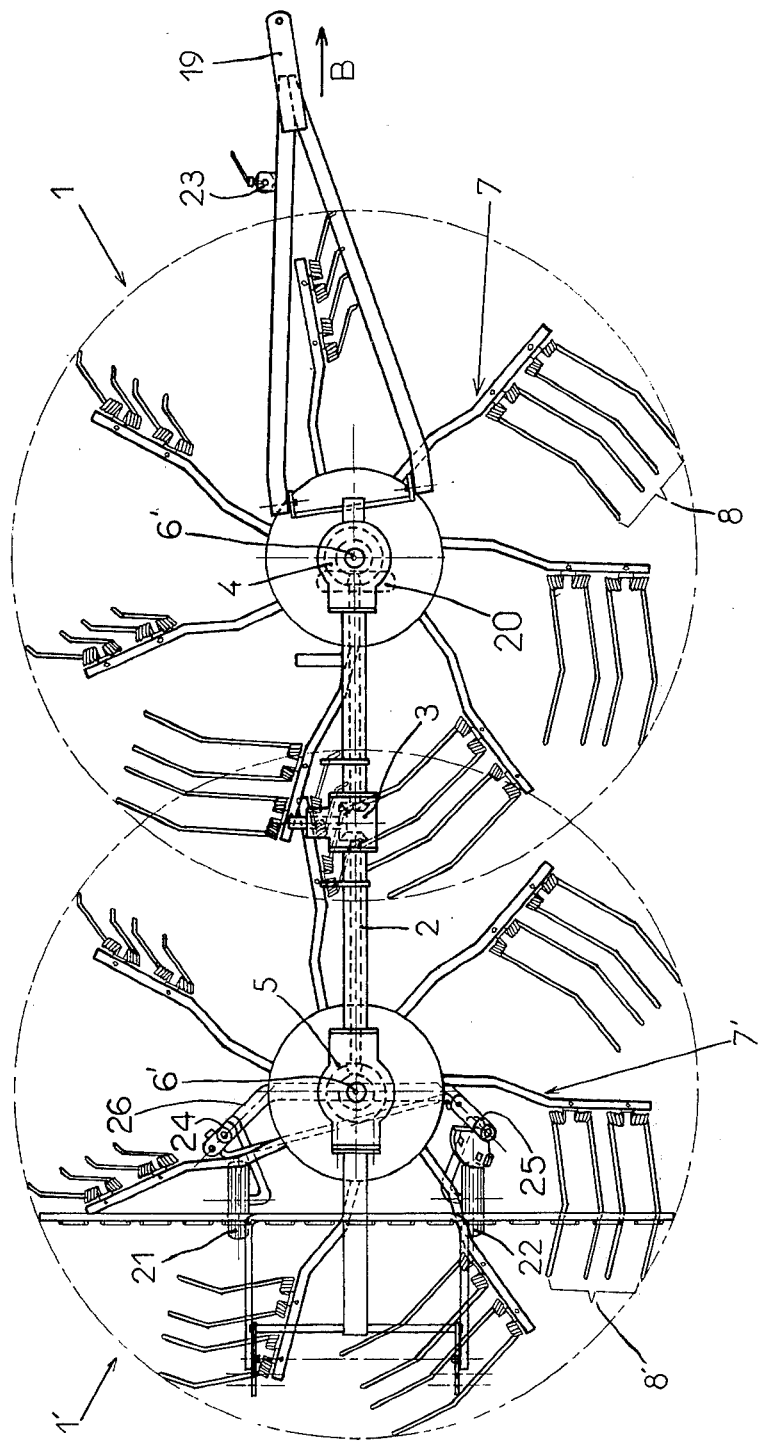

The machine as represented in FIGS. 1 and 2 comprises two rake wheels 1 and 1' interconnected by means of a transverse beam 2. The said rake wheels 1 and 1' are driven from the power take off passing of a motor vehicle, not shown, via the gear boxes 3, 4 and 5, so as to rotate in identical directions of rotation F and F', either from left to right or from right to left, about upwardly directed axes 6 and 6' situated at a fixed distance from one another. The said rake wheels 1 and 1' comprise arms 7 and 7' carrying identical working tools 8 and 8' such as forks, tines or analogous elements, the said arms extending substantially radially outwards and being guided in such manner that their working tools 8 and 8', over a partial range of their revolution, pivot upwards and in the direction opposite to the directions F and F' of rotation of the said rake wheels.

The said guidance can be effected for example by means of rollers 9 and 9' fixed to control cranks 10 and 10' mounted on the ends of the arms 7 and 7' which are directed towards the rotation axes 6 and 6' of the rake wheels 1 and 1'. The said rollers 9 and 9' move in a cam track 11, 11' fixed on the support spindle 12, 12' of the rake wheels 1 and 1' and thus cause the arms 7 and 7' to pivot, over a partial range of their path of revolution on the said cam track 11, 11', about their longitudinal axes 13, 13' in such manner that the working tools 8 and 8' pivot from a position in which they are substantially perpendicular to the ground, corresponding to the raking position, upwards and in the direction opposite to the directions of rotation F and F' of the rake wheels 1 and 1', into a position in which they are substantially parallel with the ground.

According to the invention the trajectories 14 and 14' described by the outer working tools 15 and 15' of the rake wheels 1 and 1' overlap between the rotation axes 6 and 6' of the said rake wheels, the outer working tools 15 of the rake wheel 1 passing above the outer working tools 15' of the rake wheel 1' in this zone of overlap of the said trajectories and the longitudinal axes 13 and 13' of the tool carrier arms 7 and 7' - seen perpendicularly of the rotation axes 6 and 6' - crossing the rotation axes 6 and 6' of the rake wheels 1 and 1' at two points situated substantially at equal distances above the ground (see FIGS. 2 and 3). In other words, as seen in FIGS. 2 and 3, the axes 6 and 6' cross the longitudinal axes 13, 13' of the arms 7, 7' at points A and A', which are located the same height H above the ground in the case of all points A or A'.

In the zone 16 of overlap of the trajectories 14 and 14' of the outer working tools 15 and 15' between the rotation axes 6 and 6' of the rake wheels 1 and 1', at least the part 17 of the carrier arms 7 on which the outer working tools 15 of the rake wheel 1 are fixed and at least the part 17' of the carrier arms 7' on which the outer working tools 15' of the rake wheel 1' are fixed are staggered in height in relation to one another.

According to the example of embodiment as represented in FIGS. 1 and 2, the said height stagger is effected by the provision of an elbowed portion 18, 18' on each arm 7, 7' carrying working tools 8 and 8', in such manner that at least the part 17, 17' of the carrier arms 7 and 7' on which the working tools 8 and 8' are fixed is moved upwards when the said working tools themselves pivot upwards in the direction opposite to the directions F and F' of the rotation of the rake wheels 1 and 1'.

According to the second embodiment shown in FIG. 3, the height stagger of the parts 17 and 17' on which the working tools 8 and 8' are fixed is obtained by inclining the rotation axes 6 and 6' of the rake wheels 1 and 1' towards the direction opposite to the side on which the windrow is formed. In this case the cam track 11, 11' will be designed in such manner that the working tools 8 and 8' of the carrier arms 7a and 7a' are in contact with the ground over the whole portion of the revolution corresponding to raking action.

The fodder is raked by the working tools 8 of the rake wheel 1 in the raking zone which extends substantially from the point a to the point b, and the raked fodder is diengaged from the said working tools as soon as these start their upward pivoting. The said point b corresponds to the commencement of the upward pivoting of the working tools 8 of the rake wheel 1. This same fodder is entirely taken up again by the working tools 8' of the rake wheel 1' which themselves rake in the raking zone extending substantially from the point a' to the point b' and deposit the whole of the fodder in the form of a lateral windrow.

In this arrangement, the passing of the fodder from the rake wheel 1 to the rake wheel 1' is effected under excellent conditions. There are no losses between the two rake wheels and they do not need to be staggered greatly in relation to one another - seen in the direction of travel.

According to the invention the working tools 8 of the first rake wheel 1 are guided in such manner that the point b corresponding to the commencement of upward pivoting of the said working tools is situated farther forward - seen in the direction of travel - than the point b' of commencement of upward pivoting of the working tools 8' of the rake wheel 1' placed on the windrow side, when the rake wheels 1 and 1' are disposed substantially perpendicularly to the direction A of travel (FIG. 1).

This characteristic has the effect on the one hand that the working tools 8 of the rake wheel 1 are completely raised in the zone 16 of overlap and on the other hand that the width of the raking zone of the working tools of the rake wheel 1' is as large as possible.

The machine as represented in FIGS. 1 to 4 is attached to the motor vehicle (not shown) by means of a detachable draw bar 19 so that during work the transverse beam 2 is substantially perpendicular to the direction A of travel, which permits of having a great working width (FIG. 1), and in such manner that during transport the said transverse beam is substantially parallel with the direction B of travel, which permits of having a reduced transport width (FIG. 4).

The manner of conversion of the machine to pass from the working position into the transport position and vice versa and the means utilised are substantially in conformity with those described in French Patent No. 2,146,674. Thus in the working position the machine rests on the ground on a carrier wheel 20 disposed on the rake wheel 1 and a set of two carrier wheels 21 and 22 that caster and that are disposed one behind the other beneath the rake wheel 1'. To bring the machine into the transport position it is sufficient to transpose the detachable draw bar 19, to unlock the two carrier wheels 21 and 22 so that they are free to caster, to effect the raising of the forward part of the machine in such manner that the carrier wheel 20 is lifted away from the ground, and to move forward with the motor vehicle supported by the drawbar and the wheels 21 and 22. During this advance the carrier wheels 21 and 22 pivot simultaneously into a transport position and the rear of the machine rises. More particularly, the wheel 20 is directly fixed to the support spindle 12; while the wheels 20 and 21 are pivotally mounted on bearing supports 24 and 25 that are inclined relative to the ground. These bearing supports 24 and 25 are located at the ends of an arm 26 on which is fixed the support spindle 12. In the working position of FIG. 1, the wheels 21 and 22 are disposed one behind the other and are immobilized in their respective bearing support 24 or 25. To place the machine in the transport position of FIG. 4, however, the forward part of the machine is raised so that the wheel 20 is above the ground, and the wheels 21 and 22 are unlocked so as to permit them to caster and to let the machine move in the direction of the arrow B in FIG. 4. But as the bearing supports 24 and 25 are inclined relative to the ground, the pivotal movement of the wheels 21 and 22 results in the aforementioned elevation of the machine, so that the working tools 15, 15' will be desirably spaced above the ground.

To permit storage of the machine the detachable draw bar 19 is provided with a telescopic prop 23.

The apparatus for coupling the machine to the towing vehicle and its conversion from the working position to the transport position and vice versa, as described above, is given by way of non-limitative example.

What is claimed is:

1. A hay-making machine for windrowing, comprising at least two rake wheels driven by the energy of a motor vehicle so as to rotate in identical rotation directions about upwardly directed axes and each comprising arms carrying identical working tools, means mounting said wheels side by side on said machine, said arms extending substantially radially towards the exterior, means guiding said arms in such manner that their working tools, over a partial range of their revolution, pivot upwards and in the direction opposite to the directions of rotation of the said rake wheels, characterised in that the distance between said axes is such that the trajectories described by the outer working tools of the rake wheels overlap between the axes of rotation of the said rake wheels, the outer working tools of one rake wheel passing above the outer working tools of the other rake wheel in the zone of overlap of the said trajectories, and in that the longitudinal axes of the tool-carrier arms cross the axis of rotation of the associated rake wheel at a point which is situated at substantially the same distance above the ground for one rake wheel as for each other rake wheel.

2. A hay-making machine according to claim 1, characterised in that each arm carrying working tools of the rake wheels comprises an elbowed portion so that in the overlap zone of the trajectories described by the outer working tools of the rake wheels at least the part of the carrier arms on which the outer working tools of one rake wheel are fixed and at least the part of the carrier arms on which the outer working tools of the other rake wheel are fixed are staggered in height in relation to one another.

3. A hay-making machine according to claim 2, characterised in that at least the part of the arms on which the outer working tools are fixed is moved upwards when the said working tools themselves pivot upwards and in the direction opposite to the directions of rotation of the rake wheels.

4. A hay-making machine according to claim 1, characterised in that the rotation axes of the rake wheels are inclined towards the direction opposite to the side on which the windrow is formed, in such a manner that in the zone of overlap of the trajectories described by the outer working tools of the rake wheels, at least the part of the carrier arms on which the outer working tools of one rake wheel are fixed and at least the part of the carrier arms on which the outer working tools of the other rake wheel are fixed are staggered in height in relation to one another.

5. A hay-making machine according to claim 4, said guiding means guiding the working tools in such a manner that they are in contact with the ground over the entire portion of their revolution which corresponds to raking action.

6. A hay-making machine according to claim 1, said guiding means guiding the working tools of the first rake wheel in such a manner that the point corresponding to the commencement of upward pivoting of the said working tools is situated further forward - considered in the direction of travel - than the point of commencement of the upward pivoting of the working tools of the other rake wheel placed on the windrow side when the rake wheels are disposed substantially perpendicularly to the direction of travel.

7. A hay-making machine according to claim 1, characterised in that each said arm carries on its radially inner end a control crank having a roller that moves in a guide cam so as to cause the working tools to pivot upwardly and downwardly.

8. A hay-making machine according to claim 1, characterised in that said axes are disposed at an invariable distance from one another.

9. A hay-making machine according to claim 1, characterised in that the working tools on one said rake wheel are identical to the working tools on each other said rake wheel.

* * * * *